(12) United States Patent
Lin et al.

(10) Patent No.: US 8,054,615 B2
(45) Date of Patent: Nov. 8, 2011

(54) FOLDABLE ELECTRONIC DEVICE AND PIVOT APPARATUS THEREOF

(75) Inventors: San-Feng Lin, Taipei (TW); Yuan-An Hsu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 157 days.

(21) Appl. No.: 12/501,492

(22) Filed: Jul. 13, 2009

(65) Prior Publication Data

US 2010/0073857 A1    Mar. 25, 2010

(30) Foreign Application Priority Data

Sep. 19, 2008    (TW) ................................ 97136086 A

(51) Int. Cl.
   *G06F 1/16*      (2006.01)
   *E05D 3/06*      (2006.01)
   *E05D 3/10*      (2006.01)
   *A47B 81/00*      (2006.01)
   *H04M 1/00*      (2006.01)

(52) U.S. Cl. ......... 361/679.07; 361/679.06; 361/679.26; 361/679.27; 248/917; 16/366; 16/367; 312/223.1; 312/223.2; 455/575.1; 455/575.3

(58) Field of Classification Search .......... 361/679.01–679.45, 679.55–679.59; 248/917–924; 16/221–392; 312/223.1, 223.2; 455/575.1, 575.3

See application file for complete search history.

(56) References Cited

U.S. PATENT DOCUMENTS
2003/0090862 A1 * 5/2003 Hsiang .......................... 361/681

FOREIGN PATENT DOCUMENTS
CN      2833692      11/2006

* cited by examiner

*Primary Examiner* — Jayprakash N Gandhi
*Assistant Examiner* — Nidhi Desai
(74) *Attorney, Agent, or Firm* — Jianq Chyun IP Office

(57) ABSTRACT

A pivot apparatus adapted to connect a host and a display includes a rotary base having a first part and a second part, a connecting plate, a pivot component, a first connecting rod and a hook. The first part is embedded at the host. The second part has a rotary shaft embedded at a first edge of the connecting plate. The pivot component is pivotally connected between a rear surface of the display and a second edge of the connecting plate. The first connecting rod is slidably disposed at the connecting plate and has at least a locking hole. The hook is disposed at the rear surface and passes through the connecting plate to be slidably disposed in the locking hole. The hook is used to interfere with the first connecting rod to restrict the rotation of the display by the pivot component relative to the connecting plate.

14 Claims, 6 Drawing Sheets

FOLDABLE ELECTRONIC DEVICE AND PIVOT APPARATUS THEREOF

CROSS-REFERENCE TO RELATED APPLICATION

This application claims the priority benefit of Taiwan application serial no. 97136086, filed on Sep. 19, 2008. The entirety of the above-mentioned patent application is hereby incorporated by reference herein and made a part of specification.

BACKGROUND OF THE INVENTION

1. Field of the Invention

The invention relates to an electronic device and a pivot apparatus thereof and, more particularly, to a foldable electronic device and the pivot apparatus thereof.

2. Description of the Related Art

In the information age nowadays, the dependency of people on electronic products increases day by day. Since the electronic devices nowadays are required to have advantages such as high speed, high efficiency and being light, thin, short and small, foldable electronic devices such as a notebook computer, a portable phone, a personal digital assistant (PDA) and so on gradually become the main stream. These foldable electronic devices become necessary tools in people's daily life.

Generally, the foldable electronic devices are foldable to reduce the accommodating space and to achieve the objective of being light, thin, short and small. Generally, the foldable electronic device is usually composed of a display and a host. In addition, a pivot apparatus is connected at the edges of the display and the host to allow the user to open or close the foldable electronic device by rotating the display and the host about the pivot apparatus.

BRIEF SUMMARY OF THE INVENTION

The invention provides a pivot apparatus which may allow a host and a display of a foldable electronic device having the pivot apparatus to rotate about three different axes.

The invention also provides a foldable electronic device whose host and display may rotate about three different axes.

The invention provides a pivot apparatus adapted to connect a host and a display. The pivot apparatus includes a rotary base, a connecting plate, a pivot component, a first connecting rod and at least a hook. The rotary base has a first part and a second part which may rotate relative to each other. The first part is embedded at the host, and the second part has a rotary shaft. The connecting plate has a first edge and a second edge opposite to the first edge. The rotary shaft may be rotatably embedded in the first edge. The pivot component is pivotally connected between a rear surface of the display and the second edge. The first connecting rod may be slidably disposed at the connecting plate and has at least a locking hole. The hook is disposed at the rear surface and passes through the connecting plate to be disposed in the locking hole. The hook is used to interfere with the first connecting rod and restrict the position to further restrict the rotation of the display by the pivot component relative to the connecting plate.

In an embodiment of the invention, the pivot apparatus further includes a first elastic component which is disposed between the connecting plate and the first connecting rod to drive the first connecting rod to be restored and make the hook (locked at the display) interfere (hooked) with the first connecting rod and restrict the position.

In an embodiment of the invention, the pivot apparatus further includes a second connecting rod, and the second part of the rotary base may further have a guide rod. The second connecting rod is slidably disposed in the connecting plate and has a guide slot. The guide rod is parallel with the rotary shaft without intersecting, and it is slidably disposed in the guide slot. When the connecting plate rotates relative to the second part of the rotary base by the rotary shaft, the guide rod slides in the guide slot to drive the second connecting rod to slide relative to the connecting plate, make the second connecting rod drive the first connecting rod to rotate relative to the connecting plate and prevent the hood from interfering with the first connecting rod. The second connecting rod further has a guide surface, and the first connecting rod further has a wheel for sliding on the guide surface to push the first connecting rod to slide relative to the connecting plate. The sliding direction of the first connecting rod is vertical to the sliding direction of the second connecting rod. In addition, the pivot apparatus may further include a third connecting rod, and the second connecting rod may further have a protrusion. The first end of the third connecting rod is pivotally connected to the connecting plate, and a second end of the third connecting rod is used to interfere with the protrusion to restrict the sliding of the second connecting rod relative to the connecting plate. When the hook goes into the locking hole, the hook pushes the third connecting rod to make the second end of the third connecting rod leave away from the second connecting rod. The pivot apparatus may further have a second elastic component. The second elastic component is disposed between the connecting plate and the third connecting rod to drive the third connecting rod to be restored and to make the second end of the third connecting rod to interfere with the protrusion to further restrict the sliding of the second connecting rod relative to the connecting plate. When the hook is slidably disposed in the locking hole, the hook is against the third connecting rod to restrict the restoring of the third connecting rod.

In an embodiment of the invention, the pivot apparatus further includes a position limiting component, and the rotary base further has a position limiting hole. The position limiting component is slidably disposed at the host to be inserted in the position limiting hole to restrict the rotation of the second part of the rotary base relative to the first part of the rotary base.

The invention further provides a foldable electronic device including a host, a display and a pivot apparatus. The pivot apparatus is connected to the host and the display.

When the pivot apparatus in the invention is assembled to the foldable electronic device, the display may rotate relative to the host to open or close the foldable electronic device. In addition, the user may adjust an elevation angle of the display relative to the host via the pivot apparatus. The user also may adjust the display angle of the display relative to the host via the rotary base. Therefore, the display may rotate relative to the host about three axes.

These and other features, aspects and advantages of the present invention will become better understood with regard to the following description, appended claims, and accompanying drawings.

DETAILED DESCRIPTION OF THE EMBODIMENTS

Figure 1:
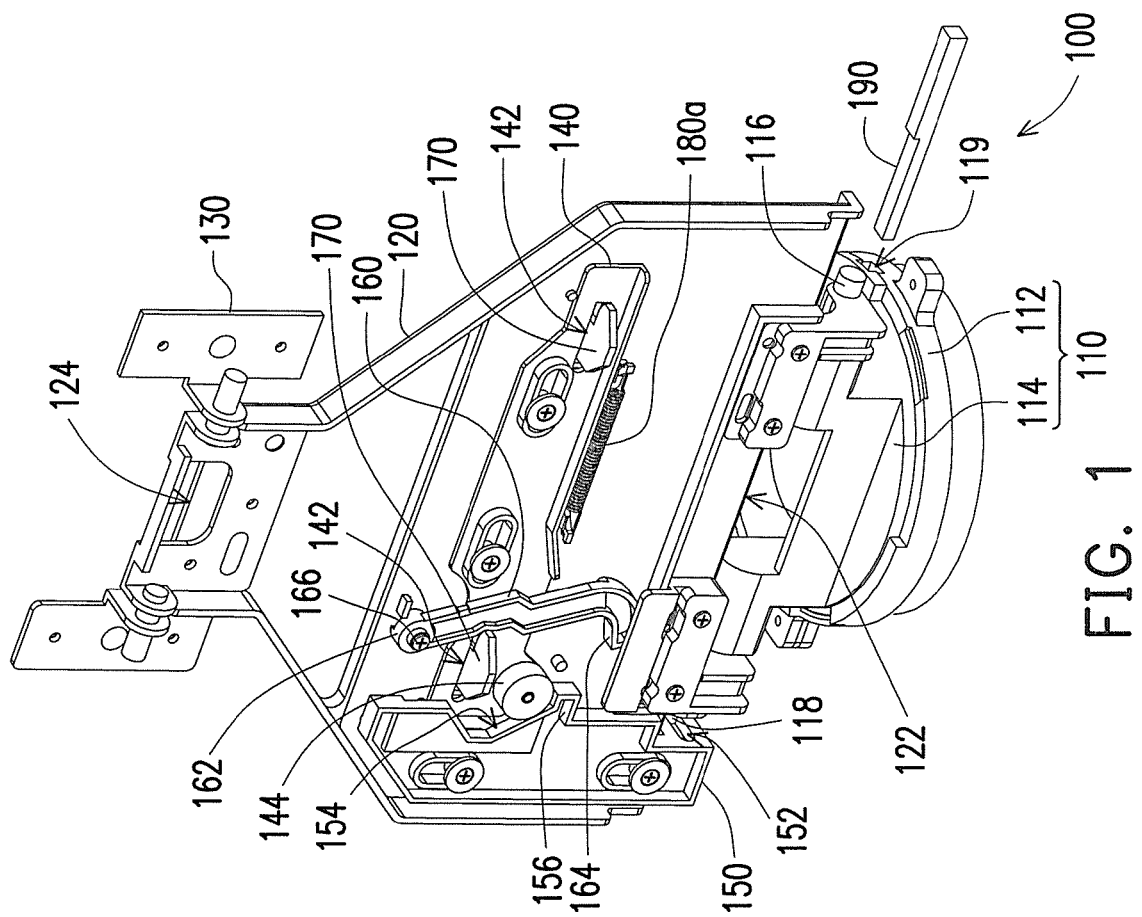
FIG. 1 is a three-dimensional diagram showing the pivot apparatus in an embodiment of the invention.

The detailed structure of the pivot apparatus is disclosed in the following embodiment with drawings. The structures of the host and the display of the foldable electronic device are drawn schematically, and other components such as a keyboard on the host are omitted. In the drawings, the same element is denoted with the same symbol.

Figure 2:
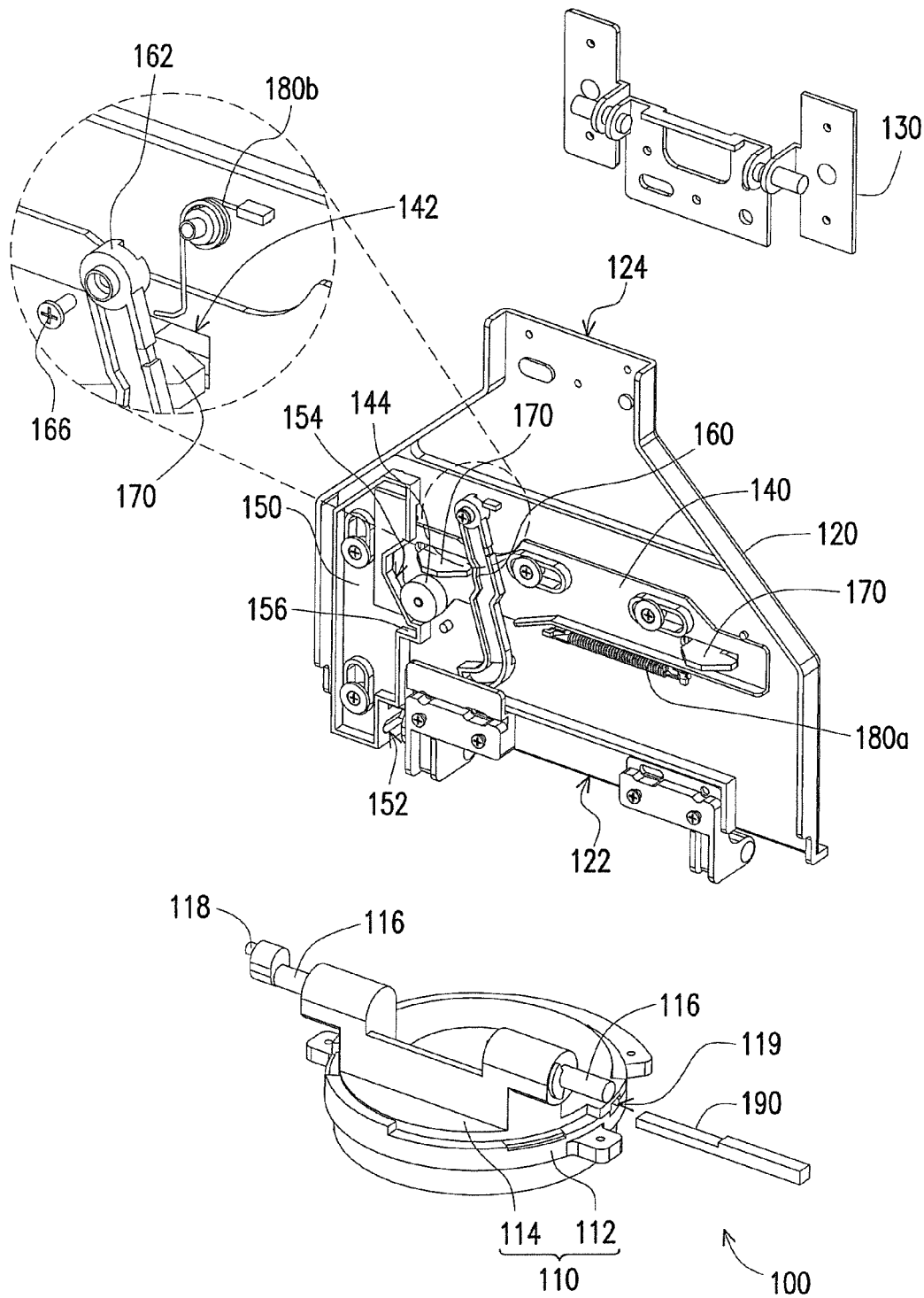
FIG. 2 is a three-dimensional exploded diagram showing the pivot apparatus in FIG. 1.

FIG. 1 is a three-dimensional diagram showing the pivot apparatus in an embodiment of the invention. FIG. 2 is a three-dimensional exploded diagram showing the pivot apparatus in FIG. 1. As shown in FIG. 1 and FIG. 2, the pivot apparatus 100 includes a rotary base 110, a connecting plate 120 and a pivot component 130. The rotary base 110 has a first part 112 and a second part 114 which may rotate relative to each other. The second part 114 has a rotary shaft 116 (in the drawings, two coaxial rotary shafts 116 are shown). The connecting plate 120 has a first edge 122 and a second edge 124 opposite to the first edge 122. The rotary shaft 116 may be rotatably embedded in the first edge 122, and it may be used to make the connecting plate 120 rotate relative to the second part 114 of the rotary base 110 by the rotary shaft 116. The pivot component 130 may be connected to the second edge 124 of the connecting board 120, and it may rotate relative to the connecting plate 120.

FIG. 3 to FIG. 6 are three-dimensional diagrams showing the foldable electronic device in different states in an embodiment of the invention. As shown in FIG. 1 to FIG. 4, the pivot apparatus 100 may be assembled in a foldable electronic device 10 having a host 200 and a display 300. The first part 112 of the rotary base 110 may be embedded in the host 200, and the pivot component 130 may be pivotally connected between the rear surface 310 of the display 300 and the second edge 124 of the connecting plate 120.

Figure 3:
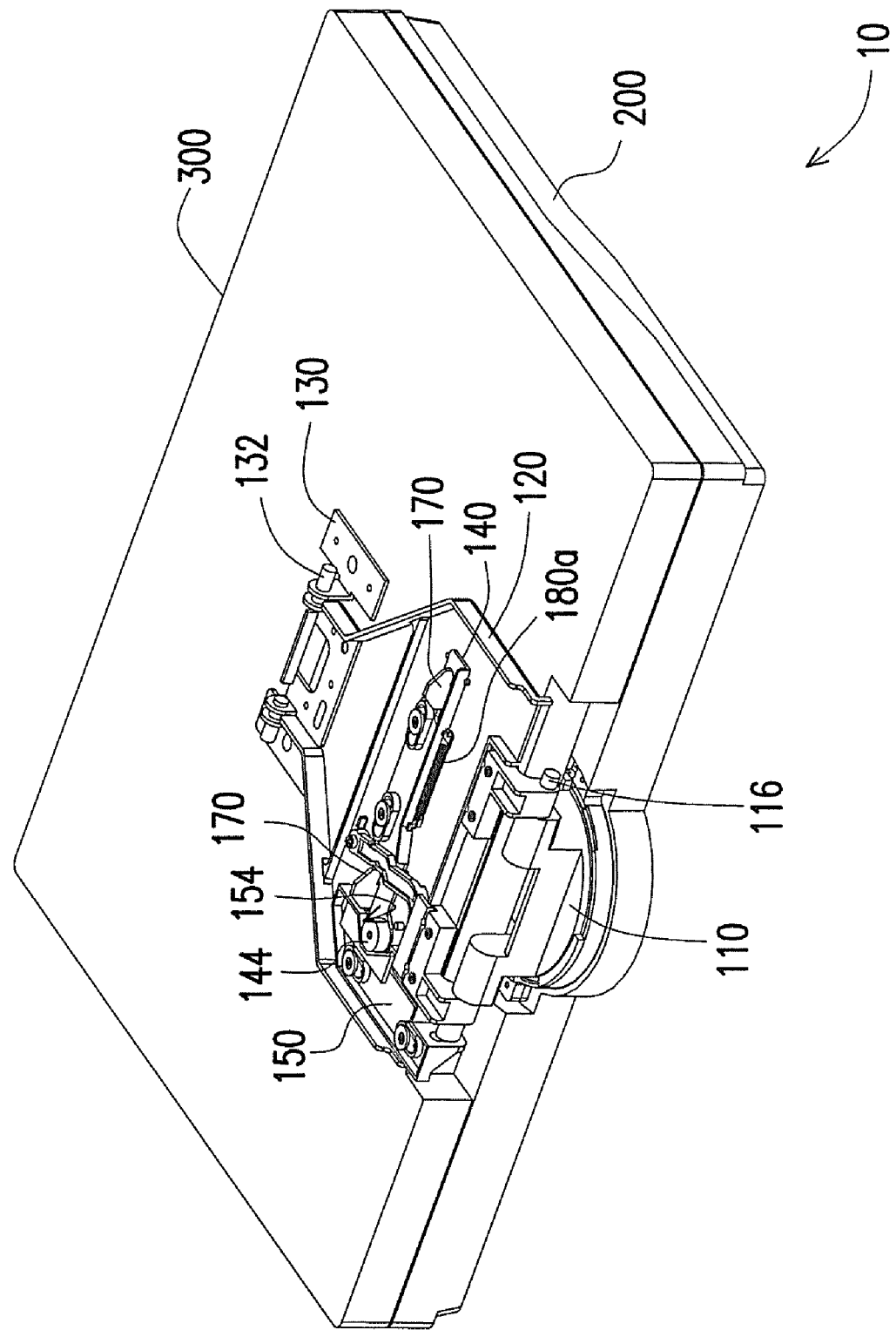
FIG. 3 to FIG. 6 are three-dimensional diagrams showing the foldable electronic device under different states in an embodiment of the invention.
Figure 4:
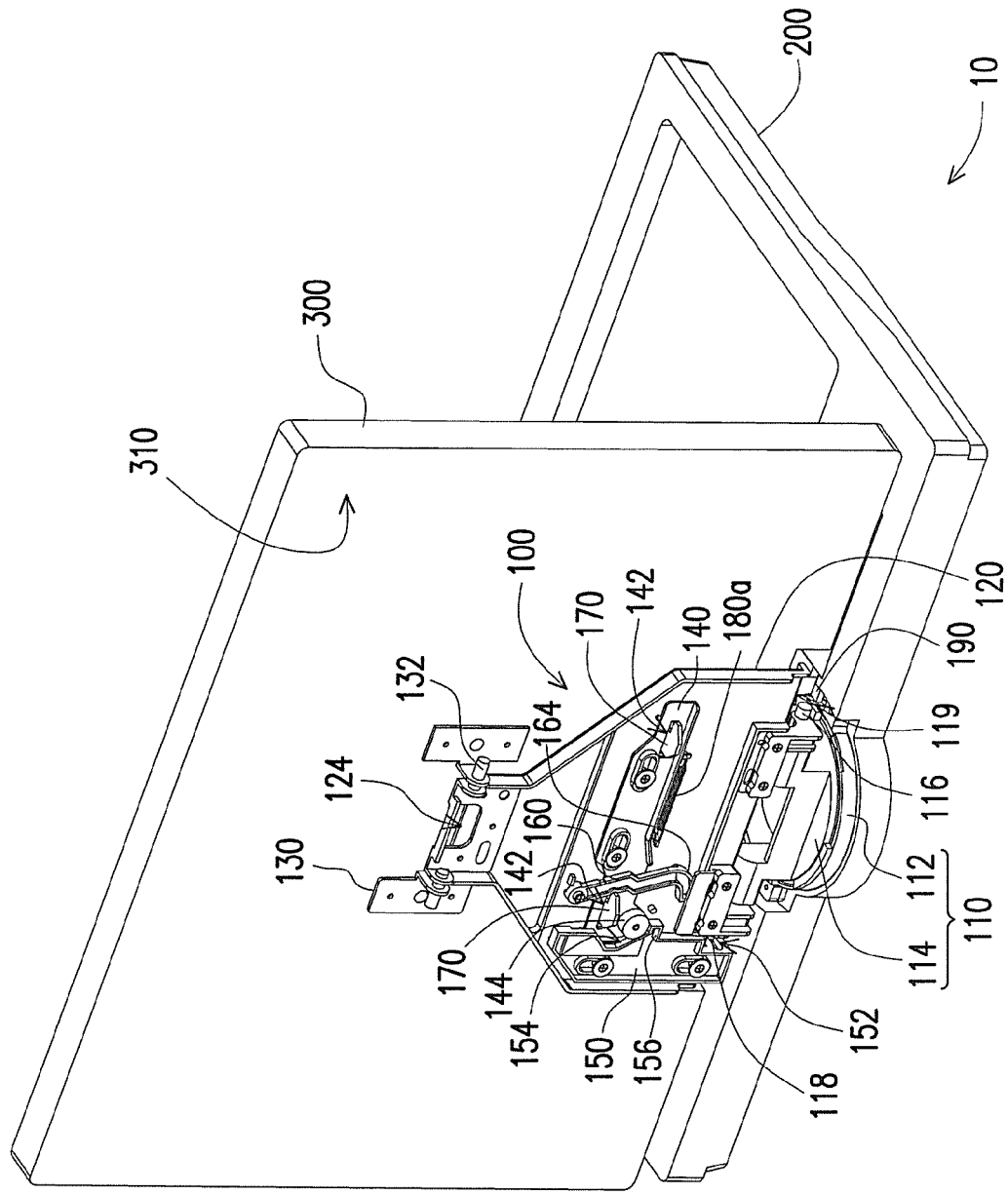

In the embodiment, as shown in FIG. 3 and FIG. 4, the display 300 may rotate with the connecting plate 120 relative to the rotary base 110 and the host 200 by the rotary shaft 116 to open (as shown in FIG. 3) or close (as shown in FIG. 4) the foldable electronic device 10.

Figure 5:
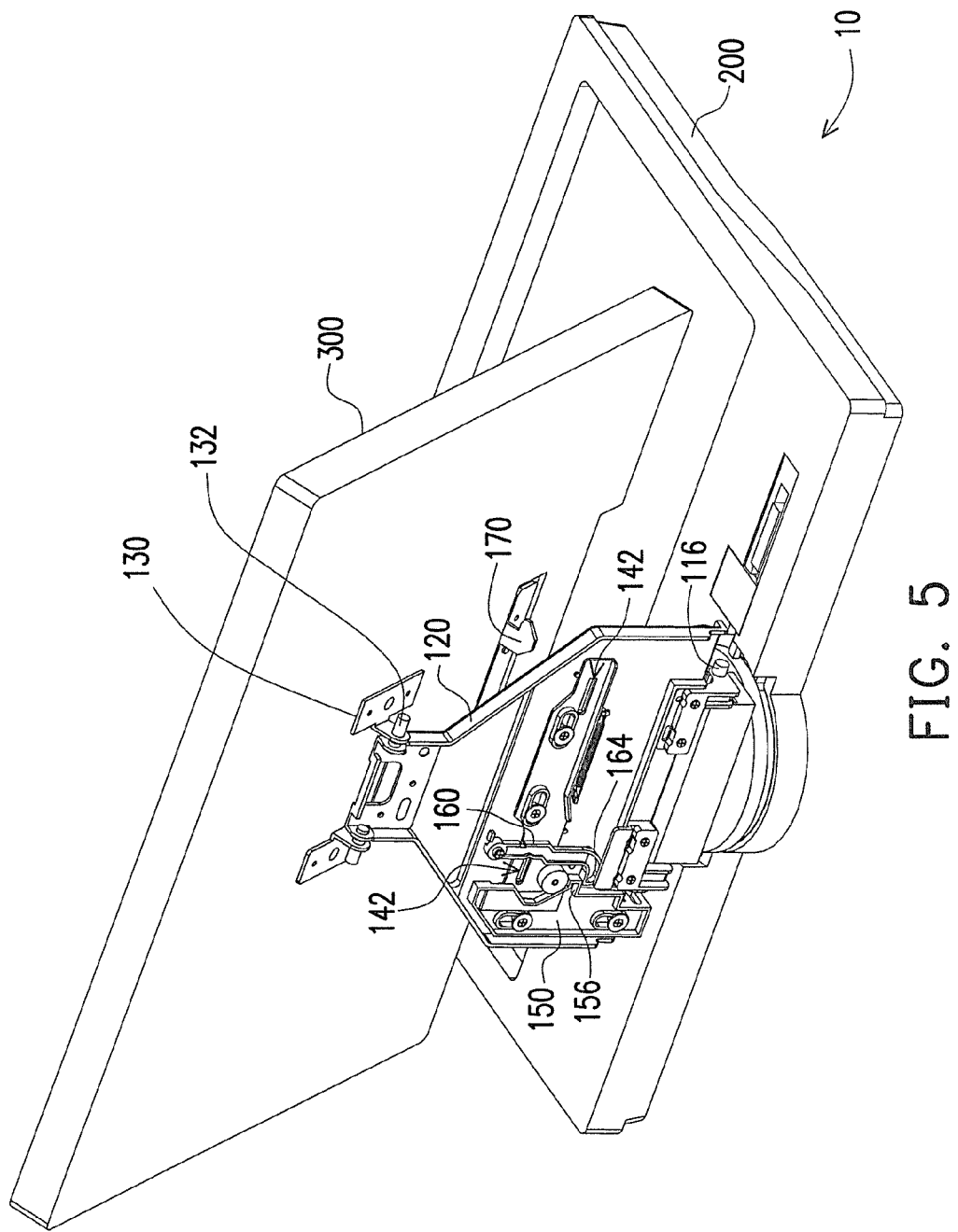

In addition, as shown in FIG. 4 and FIG. 5, the display 300 also may rotate relative to the connecting plate 120 and the host 200 about an axis 132 of the pivot component 130 to adjust an elevation angle (as shown in FIG. 5) of the display 300 relative to the host 200.

Figure 6:
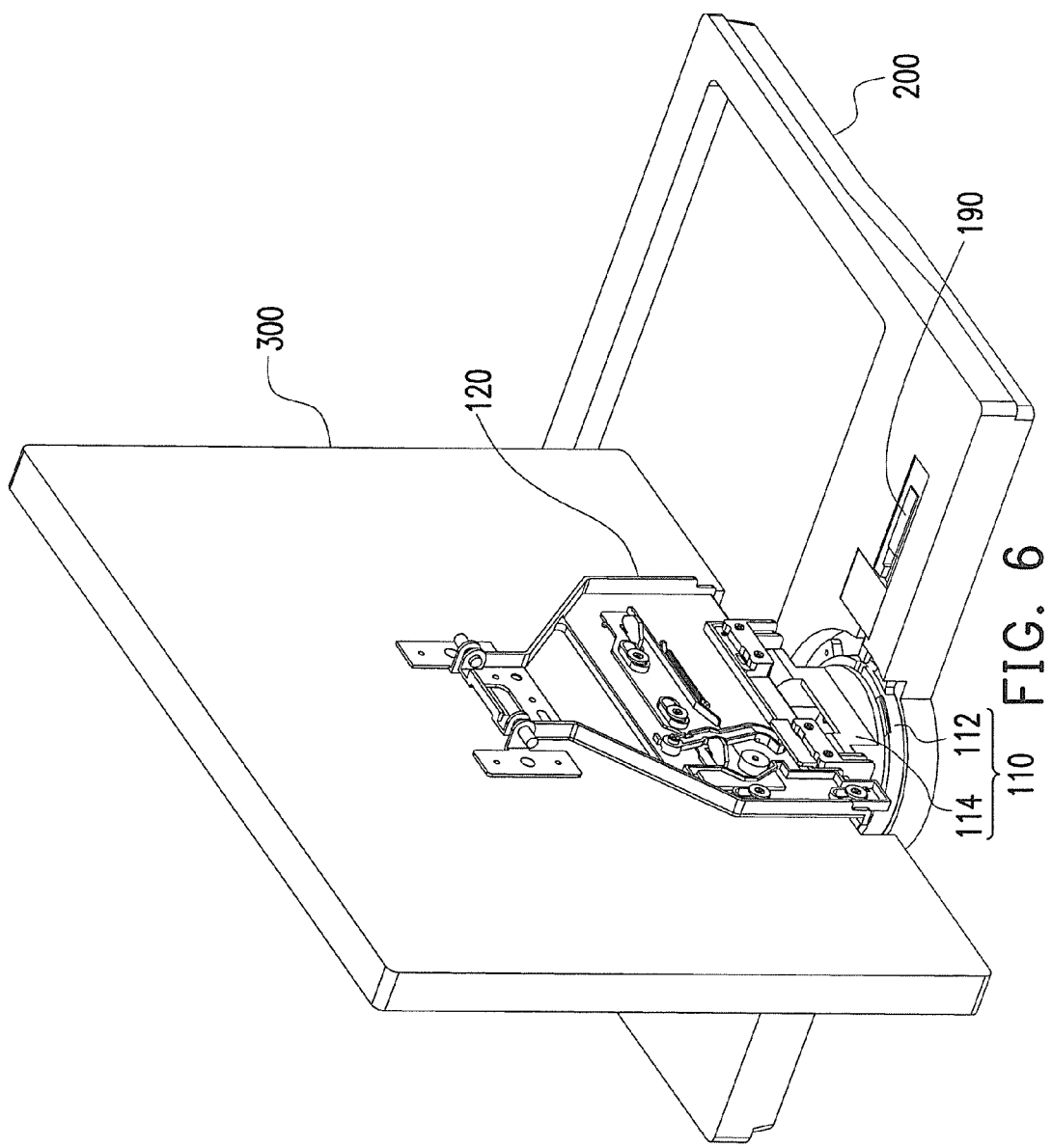

In addition, as shown in FIG. 4 and FIG. 6, the display 300 may rotate relative to the first part 112 of the rotary base 110 and the host 200 along with the connecting plate 120 and the second part 114 of the rotary base 110 to adjust the display angle 200 (as shown in FIG. 6) of the display 300 relative to the host 200. Thus, in the embodiment, the display 300 may rotate relative to the host 200 about three different axes.

As shown in FIG. 1 and FIG. 2, the second part 114 of the rotary base 110 may further have a guide rod 118, and the guide rod 118 may be parallel but not coaxial with the rotary shaft 116. In addition, the pivot apparatus 100 may further include a first connecting rod 140, a second connecting rod 150, a third connecting rod 160, at least a hook 170 (in the drawings of the embodiment, two hooks are shown), a first elastic component 180a and a second elastic component 180b.

The first connecting rod 140 is slidably disposed at the connecting plate 120, and it has at least a locking hole 142 (in the drawings of the embodiment, two hooks are shown) and a wheel 144. The second connecting rod 150 is slidably disposed at the connecting plate 120 and has a guide slot 152, a guide surface 154 and a protrusion 156. The guide rod 118 is slidably disposed in the guide slot 152, and it may be used to drive the second connecting rod 150 to slide relative to the connecting plate 120. In addition, the wheel 144 may slide on the guide surface 154 to drive the first connecting rod 140 to slide relative to the connecting plate 120. The sliding direction of the first connecting rod 140 is vertical to that of the second connecting rod 150. In addition, a first end 162 of the third connecting rod 160 may be pivotally connected to the connecting plate 120, and a second end 164 of the third connecting rod 160 may be used to interfere with the protrusion 156 to restrict the sliding of the second connecting rod 150 relative to the connecting plate 120.

In addition, as shown in FIG. 1 and FIG. 4, the hooks 170 may be disposed at the rear surface of the display 300, and they also may pass through the connecting plate 120 to be slidably disposed at the locking holes 142 of the first connecting rod 140. In addition, the hooks 170 may be used to interfere with the first connecting rod 140 to prevent the display 300 from rotating relative to the connecting plate 120 by the axis 132 of the pivot apparatus 130.

In addition, the first elastic component 180a is, for example, a helix spring, and the corresponding two ends are connected to the connecting plate 120 and the first connecting rod 140, respectively. The first elastic component 180a may be used to drive the first connecting rod 140 to be restored to make the hooks 170 interfere with the first connecting rod 140.

In addition, the second elastic component 180b may be a torsional spring, and it may be locked between the connecting plate 120 and the first end 162 of the third connecting rod 160 by a screw 166. The second elastic component 180b may be used to drive the third connecting rod 160 to be restored, and the second end 164 of the third connecting rod 160 may interfere with the protrusion 156. Thus, the second connecting rod 150 cannot slide relative to the connecting plate 120. Then, the connecting plate 120 may not rotate relative to the second part 114 of the rotary base 110 by the rotary shaft 116.

As shown in FIG. 3 and FIG. 4, when the foldable electronic device 10 is closed as in FIG. 3, the first elastic component 180a may drive the first connecting rod 140 to be restored to make the hooks 170 interfere with the first connecting rod 140. At that moment, the display 300 cannot rotate relative to the connecting plate 120 by the axis 132 of the pivot component 130, and it only may rotate relative to the host 200 by the rotary shaft 116 to open (as shown in FIG. 3) or close (as shown in FIG. 4) the foldable electronic component 10.

The guide rod 118 is not coaxial with the rotary shaft 116. When the display 300 rotates relative to the host 200 by the rotary shaft 116 from the position in FIG. 3 to the position in FIG. 4, the guide rod 118 may slide in the guide slot 152. At that moment, the guide rod 118 may drive the second connecting rod 150 to slide upward relative to the connecting plate 120, and the second connecting rod 150 also may drive the first connecting rod 140 to slide rightward relative to the connecting plate 120 via the cooperation of the wheel 144 and the guide surface 154 until the foldable electronic device 10 is open.

As shown in FIG. 4 and FIG. 5, when the foldable electronic device 10 is open, the hooks 170 do not interfere with the first connecting rod 140. Thus, the display 300 may rotate relative to the connecting plate 120 by the axis 132 of the pivot component 130 to adjust the elevation angle of the display 300 relative to the host 200 from the state in FIG. 4 to the state in FIG. 5.

When the user adjusts the elevation angle of the display 300 relative to the host 200 to make the hooks 170 leave the locking holes 142, the second elastic component 180b drives the third connecting rod 160 to be restored. At that moment, the third connecting rod 160 may cover part of the left locking hole 142, and the second end 164 of the third connecting rod 160 may interfere with the protrusion 156 of the second connecting rod 150 to prevent the second connecting rod 150 from moving downward relative to the connecting plate 120. Thus, the foldable electronic device 10 cannot be closed, and this may prevent the display 300 from being damaged due to the collision of the display 300 and the host 200 when the display rotates relative to the host 200 by the rotary shaft 116.

In addition, in other embodiments, when the hooks 170 leave the locking holes 142, and the second elastic component 180b drives the third connecting rod 160 to be restored, a gap may exist between the second end 164 of the third connecting rod 160 and the protrusion 156 of the second connecting rod 150. In addition, when the display 300 rotates an angle relative to the host 200 by the rotary shaft 116 to make the lower edge of the display 300 be against the host 200, the second end 164 of the third connecting rod 160 interferes with the protrusion 156 of the second connecting rod 150 to perform the restricting function.

In addition, when the elevation angle of the display 300 relative to the host 200 is adjusted from the state in FIG. 5 to the state in FIG. 4, the left hook 170 may drive the third connecting rod 160 to rotate when the hook goes into the locking hole 142. Thus, the second end 164 of the third connecting rod 160 may leave away from the second connecting rod 150. In addition, the left hook 170 may keep being against the third connecting rod 160 to prevent the third connecting rod 160 from restoring. At that moment, the second end 164 of the third connecting rod 160 does not interfere with the protrusion 156 of the second connecting rod 150. Thus, the foldable electronic device 10 may be close (as shown in FIG. 3) or open (as shown in FIG. 4) once again.

Besides these, as shown in FIG. 1 and FIG. 2, the second part 114 of the rotary base 110 may further have a position limiting hole 119, and the pivot apparatus 100 may further include a position limiting component 190.

As shown in FIG. 4 to FIG. 6, the position limiting component 190 may be slidably disposed in the host 200, and an end of the position limiting component 190 may be inserted in the position limiting hole 119 to prevent the second part 114 of the rotary base 110 from rotating relative to the first part 112 of the rotary base 110. Thus, the display angle of the display 300 relative to the host 200 may be kept in the state as in FIG. 4.

To sum up, in the invention, the display may rotate relative to the rotary base and the host by the rotary shaft of the rotary base along with the connecting plate to open or close the foldable electronic device. In addition, the display also may rotate relative to the connecting plate and the host about an axis of the pivot component to adjust the elevation angle of the display relative to the host. In addition, the display also may rotate relative to the first part of the rotary base and the host with the connecting plate and the second part of the rotary base to adjust the display angle of the display that is relative to the host. Thus, the display may rotate relative to the host about three different axes.

In addition, the cooperation of the guide rod, the first connecting rod, the second connecting rod, the third connecting rod, the hook, the first elastic component and the second elastic component of the rotary base makes the user capable of adjusting the elevation angle of the display relative to the host only when the foldable electronic device is open. In addition, when the foldable electronic device is open, and the elevation angle of the display relative to the host is adjusted, the user cannot close the foldable electronic device. Thus, the display is not easy to be damaged due to the collision of the display and the host.

Besides these above, the user may insert an end of the position limiting component in the position limiting hole of the rotary base to keep the display angle of the display.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A pivot apparatus adapted to connect a host and a display, the pivot apparatus comprising:
a rotary base having a first part and a second part capable of rotating relative to each other, wherein the first part is embedded in the host, and the second part has a rotary shaft;
a connecting plate having a first edge and a second edge which are opposite to each other, wherein the rotary shaft is rotatably embedded at the first edge;
a pivot component pivotally connected between a rear surface of the display and the second edge of the connecting plate;
a first connecting rod slidably disposed at the connecting plate and having a locking hole;
a hook disposed at the rear surface and passing through the connecting plate to be slidably disposed in the locking hole, wherein the hook is used to interfere with the first connecting rod to restrict the rotation of the display by the pivot component relative to the connecting plate; and
a first elastic component disposed between the connecting plate and the first connecting rod to drive the first connecting rod to be restored and make the hook interfere with the first connecting rod.

2. The pivot apparatus according to claim 1, further comprising a second connecting rod, wherein the second part of the rotary base further has a guide rod, the second connecting rod is slidably disposed at the connecting plate and has a guide slot, the guide rod is parallel with the rotary shaft without intersecting and is slidably disposed in the guide slot, and when the connecting plate rotates by the rotary shaft relative to the second part of the rotary base, the guide rod slides in the guide slot to drive the second connecting rod to slide relative to the connecting plate and to make the second connecting rod drive the first connecting rod to slide relative to the connecting plate and to prevent the hook from interfering with the first connecting rod.

3. The pivot apparatus according to claim 2, wherein the second connecting rod further has a guide surface, and the first connecting rod further has a wheel for sliding on the guide surface to drive the first connecting rod to slide relative to the connecting plate.

4. The pivot apparatus according to claim 2, wherein the sliding direction of the first connecting rod is vertical to the sliding direction of the second connecting rod.

5. The pivot apparatus according to claim 2, further comprising a third connecting rod, wherein the second connecting rod has a protrusion, a first end of the third connecting rod is pivotally connected to the connecting plate, a second end of the third connecting rod is used to interfere with the protrusion to restrict the sliding of the second connecting rod relative to the connecting plate, and when the hook passes through the locking hole, the hook pushes the third connecting rod to make the second end of the third connecting rod leave away from the second connecting rod.

6. The pivot apparatus according to claim 5, further comprising a second elastic component, wherein the second elastic component is disposed between the connecting plate and the third connecting rod to drive the third connecting rod to be restored and make the second end of the third connecting rod interfere with the protrusion and restrict the sliding of the second connecting rod relative to the connecting plate, and when the hook is slidably disposed in the locking hole, the hook is against the third connecting rod to restrict the restoring of the third connecting rod.

7. The pivot apparatus according to claim 1, further comprising a position limiting component, wherein the rotary base further has a position limiting hole, and the position limiting component is slidably disposed at the host to be inserted in the position limiting hole to restrict the rotation of the second part of the rotary base relative to the first part of the rotary base.

8. A foldable electronic device comprising:
a host;
a display; and
a pivot apparatus connected to the host and the display, the pivot apparatus including:
   a rotary base having a first part and a second part capable of rotating relative to each other, wherein the first part is embedded at the host, and the second part has a rotary shaft;
   a connecting plate having a first edge and a second edge which are opposite to each other, wherein the rotary shaft is rotatably embedded at the first edge;
   a pivot component pivotally connected between a rear surface of the display and the second edge of the connecting plate;
   a first connecting rod slidably disposed at the connecting plate and having at least a locking hole;
   a hook disposed at the rear surface and passing through the connecting plate to be slidably disposed in the locking hole, wherein the hook is used to interfere with the first connecting rod to restrict the rotation of the display by the pivot component relative to the connecting plate; and
   a first elastic component disposed between the connecting plate and the first connecting rod to drive the first connecting rod to be restored and to make the hook interfere with the first connecting rod.

9. The foldable electronic device according to claim 8, wherein the pivot apparatus further comprises a second connecting rod, the second part of the rotary base further has a guide rod, the second connecting rod is slidably disposed at the connecting plate and has a guide slot, the guide rod is parallel with the rotary shaft without intersecting and is slidably disposed in the guide slot, and when the connecting plate rotates relative to the second part of the rotary base by the rotary shaft, the guide rod slides in the guide slot to drive the second connecting rod to slide relative to the connecting plate and to make the second connecting rod drive the first connecting rod to slide relative to the connecting plate and prevent the hood from interfering with the first connecting rod.

10. The foldable electronic device according to claim 9, wherein the second connecting rod further has a guide surface, and the first connecting rod further has a wheel for sliding on the guide surface to drive the first connecting rod to slide relative to the connecting plate.

11. The foldable electronic device according to claim 9, wherein the sliding direction of the first connecting rod is vertical to the sliding direction of the second connecting rod.

12. The foldable electronic device according to claim 9, wherein the pivot apparatus further comprises a third connecting rod, the second connecting rod further has a protrusion, the first end of the third connecting rod is pivotally connected to the connecting plate, a second end of the third connecting rod is used to interfere with the protrusion to restrict the sliding of the second connecting rod relative to the connecting plate, and when the hook goes into the locking hole, the hook pushes the third connecting rod to make the second end of the third connecting rod leave away from the second connecting rod.

13. The foldable electronic device according to claim 12, wherein the pivot apparatus further comprises a second elastic component disposed between the connecting plate and the third connecting rod to drive the third connecting rod to be restored and to make the second end of the third connecting rod interfere with the protrusion to restrict the sliding of the second connecting rod relative to the connecting plate, and when the hook is slidably disposed in the locking hole, the hook is against the third connecting rod to restrict the be restoring of the third connecting rod.

14. The foldable electronic device according to claim 8, wherein the pivot apparatus further comprises a position limiting component, the rotary base further has a position limiting hole, and the position limiting component is slidably disposed at the host to be inserted in the position limiting hole to restrict the rotation of the second part of the rotary base relative to the first part of the rotary base.

* * * * *